Figure 1:
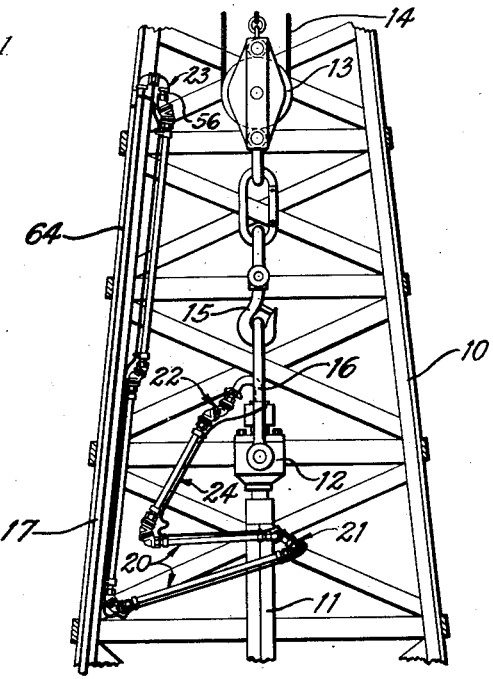

Dec. 12, 1933.  L. S. HAMER  1,938,829
CONDUIT
Filed Dec. 29, 1930    4 Sheets-Sheet 1

INVENTOR
LELAND S. HAMER
BY
HIS ATTORNEY.

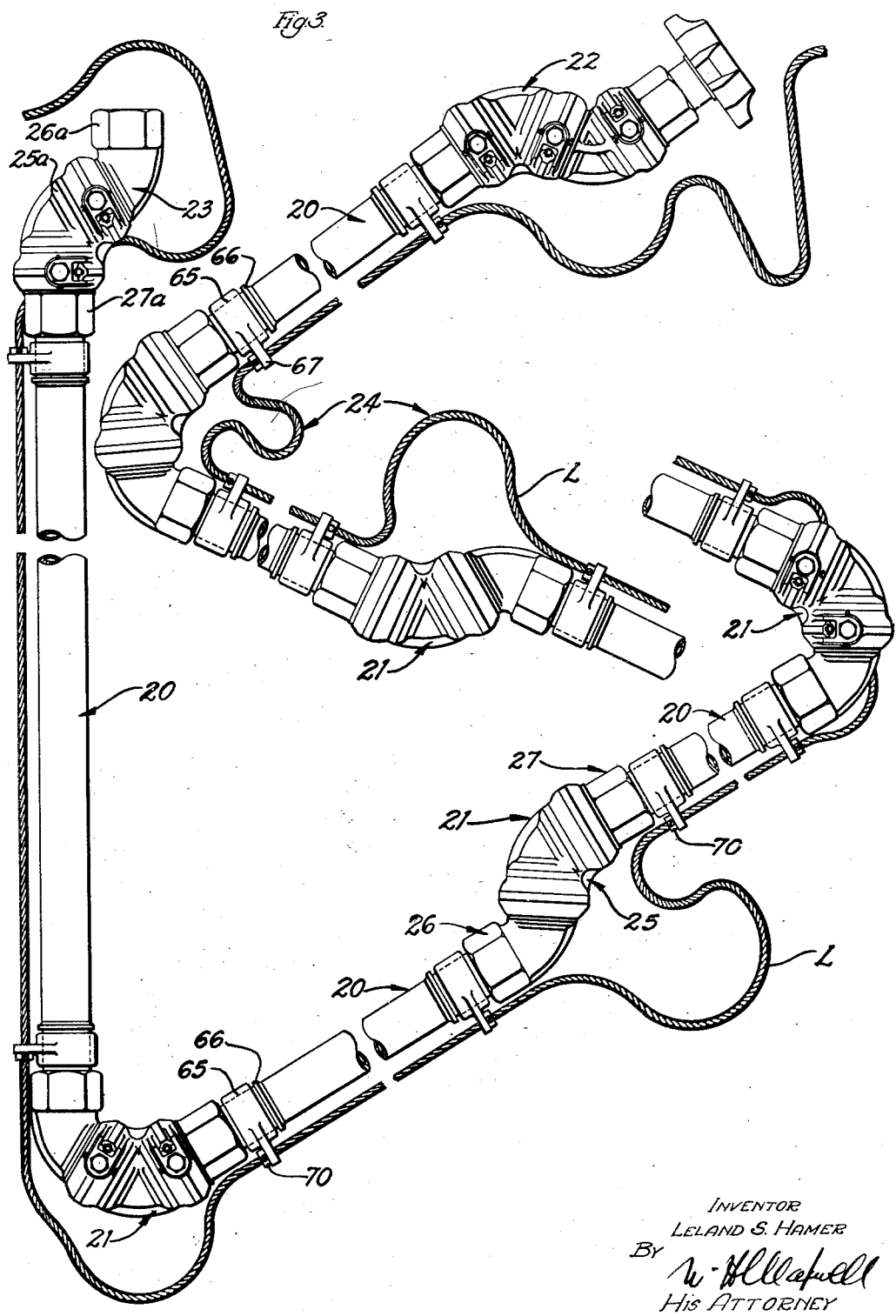

Dec. 12, 1933.   L. S. HAMER   1,938,829
CONDUIT
Filed Dec. 29, 1930    4 Sheets-Sheet 3
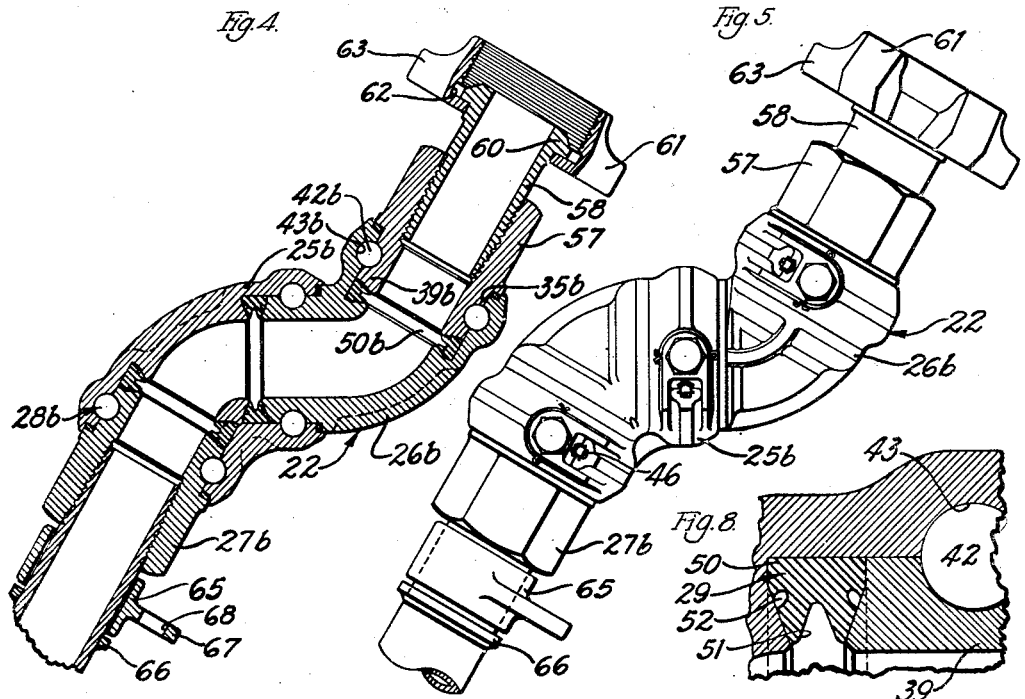
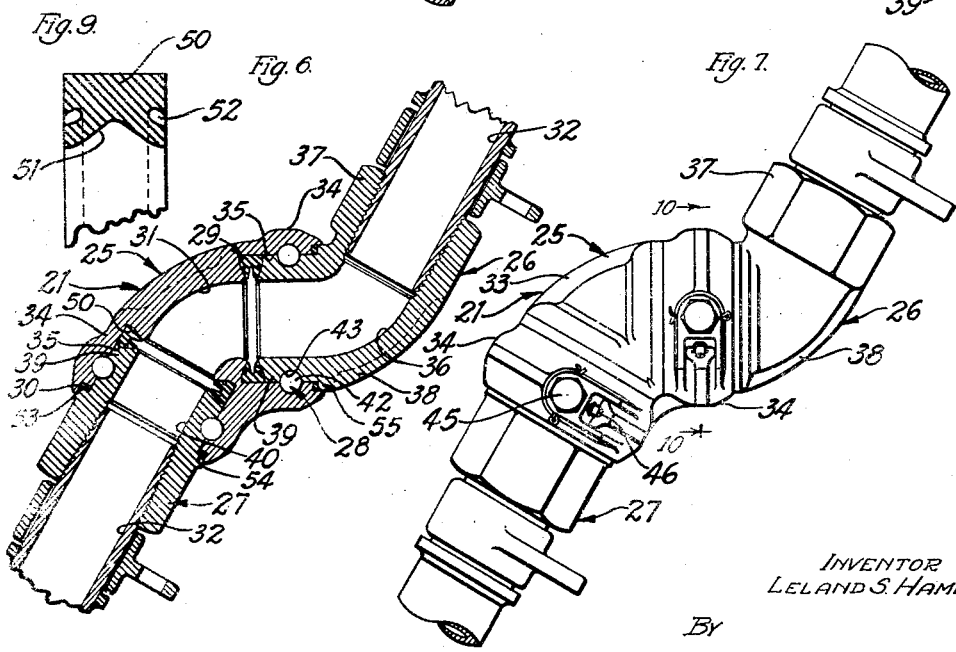
INVENTOR
LELAND S. HAMER
BY
His ATTORNEY Dec. 12, 1933.  L. S. HAMER  1,938,829
CONDUIT
Filed Dec. 29, 1930  4 Sheets-Sheet 4
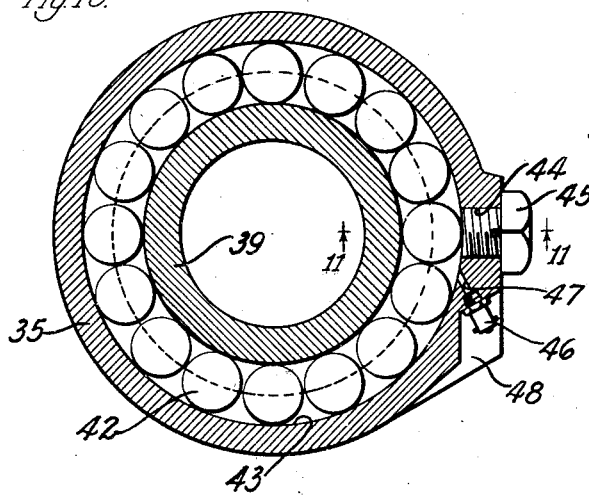
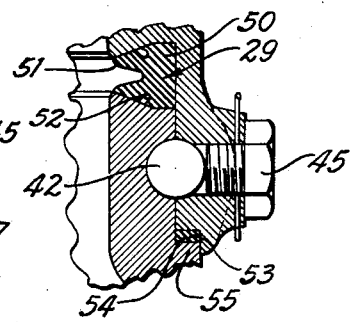
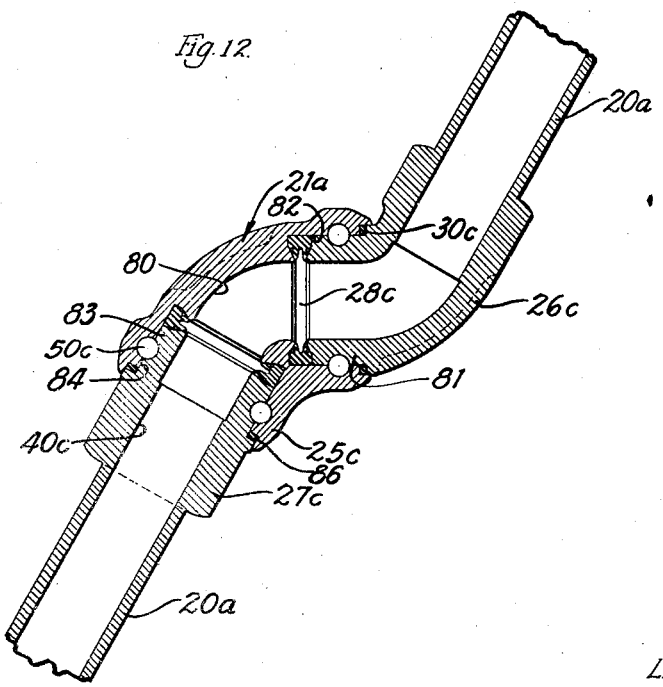
INVENTOR
LELAND S. HAMER
BY
His ATTORNEY Patented Dec. 12, 1933

1,938,829

UNITED STATES PATENT OFFICE 1,938,829

CONDUIT

Leland S. Hamer, Long Beach, Calif., assignor to Chikson Oil Tool Company, Ltd., Fullerton, Calif., a corporation of California Application December 29, 1930
Serial No. 505,257

8 Claims. (Cl. 285—96)

This invention relates to means for handling or passing fluid, and relates more particularly to a flexible fluid conduit. It is a general object of the invention to provide a practical, effective and dependable flexible conduit.

In numerous situations it is desirable to provide a conduit for passing fluid that is flexible to permit ready handling or to permit relative movement between the source of fluid supply and the part receiving the fluid. Rubber hose and hose formed of a combination of rubber and fabric have been in general use in such situations. Rubber, or rubber and fabric, hose and conduits have certain characteristics limiting their application and practicability. For example, when used to pass rotary mud or circulating fluid to the swivel of a well drilling apparatus, they often fail under the high pressures to which they are subjected and their linings loosen and pass into the well, where they stop or interfere with the circulation of the fluid. Rubber and rubber and fabric hose are not suited for handling certain classes of liquids. The action of gasoline on the linings of rubber and fabric hose employed on gasoline dispensing pumps sometimes causes the lining to be loosened, so that fragments of rubber and fabric are passed into the gasoline tank of the vehicle receiving the gasoline where they cause considerable trouble. Where hose or conduits are employed in connection with the loading and unloading of fluids, such as oil, etc., from ships, they are subjected to severe usage, sometimes being caught or pinched between the ship and wharf, and if formed of rubber and fabric they are often ruptured so that they are unsuited for further use.

It is an object of the present invention to provide a flexible conduit that is capable of withstanding continued and extreme hard usage, and that is adapted to pass fluid under high pressures without leakage or appreciable wear.

It is another object of the invention to provide a flexible conduit for handling fluid under high pressures that is safe and dependable in operation.

It is another object of the invention to provide a flexible conduit that is formed of a plurality of lengths of pipe or tubing that are connected by improved swivel or universal joints that are particularly free in their action or movement and which do not embody threaded connections or parts that are subjected to working loose and/or to permit the leakage of fluid.

A further object of the invention is to provide a joint or connection for connecting two lengths of pipe, hose, or tubing that is freely flexible to permit relative rotation and movement of the connected parts in various directions, and that is particularly simple and inexpensive of manufacture.

A further object of the invention is to provide a joint or connection for connecting parts of a conduit so that they are dependably locked together and connected, and yet free to revolve relative to one another. The joint provided by the present invention for connecting two sections of pipe, hose, or the like, embodies but three main parts or sections that are connected for relative rotation and which cannot become disconnected without destroying or disassembling the joint.

It is a further object of the invention to provide a joint for connecting two sections of a flexible conduit that embodies bearing means for connecting the sections which permits free relative movement between the sections with a minimum amount of friction and resistance and operates to positively and permanently connect the sections.

A further object of the invention is to provide an improved packing means for use in a conduit joint of the character mentioned for sealing between the relatively movable joint sections.

A further object of the invention is to provide a conduit in which the pipe or conduit sections are relatively proportioned to provide for a maximum amount of movement at an end of the conduit.

A further object of the invention is to provide a flexible conduit that embodies a safety means in the form of a cable loosely connected with the several sections of the conduit in a manner so that it will not become fouled or interfere with the operation or free flexing of the conduit.

A further object of the invention is to provide a flexible conduit that may be formed without a screw-threaded connection.

Other objects and features of the invention will be best and more fully understood from the following detailed description of typical forms and applications of the invention, throughout which description reference is had to the accompanying drawings, in which:

Fig. 1 is a fragmentary view of a portion of a typical well derrick, illustrating a form of the invention arranged therein for passing fluid to the swivel on the upper end of a drill stem.

Figure 2:
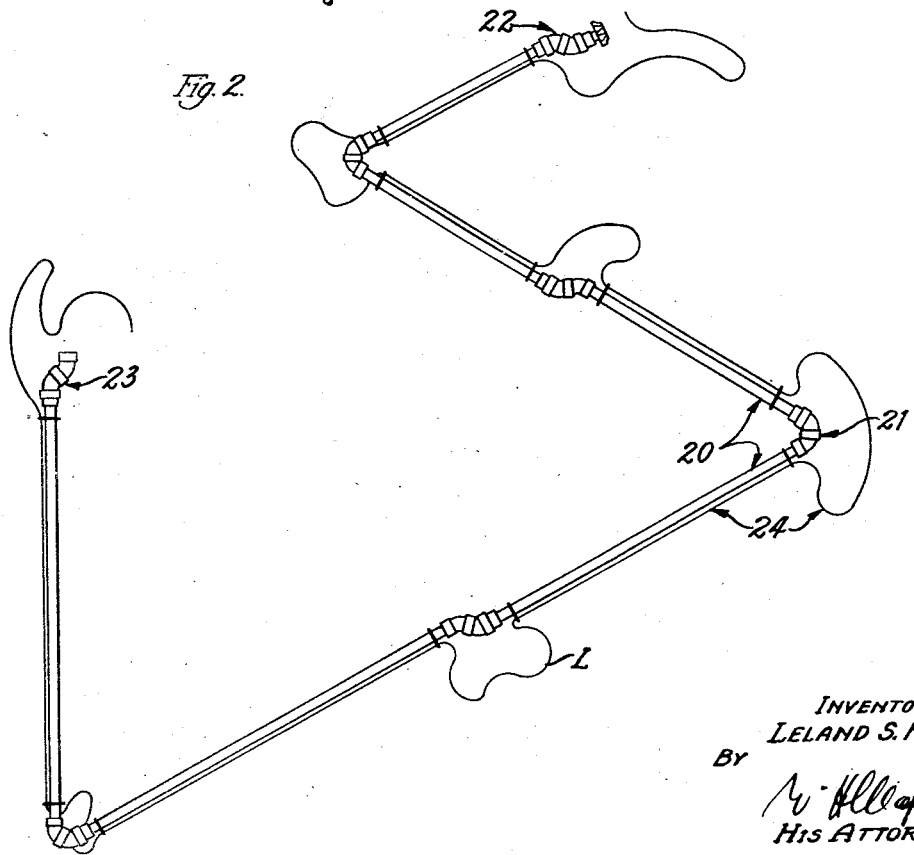

Fig. 2 is a diagrammatic view of a conduit provided by the present invention, illustrating the relative proportions or lengths of the pipe sections. Fig. 3 is an enlarged side elevation of the conduit assembly provided by the invention. Fig. 4 is an enlarged longitudinal detailed sectional view of an end joint or connection of the conduit. Fig. 5 is a side elevation of the joint illustrated in Fig. 4. Fig. 6 is an enlarged longitudinal detailed sectional view of one of the intermediate joints or connections provided by the invention. Fig. 7 is a side elevation or plan view of the joint illustrated in Fig. 6. Fig. 8 is an enlarged longitudinal detailed sectional view of a portion of a joint illustrating the packing means. Fig. 9 is an enlarged transverse detailed sectional view of a section of one of the packing members embodied in the invention. Fig. 10 is an enlarged transverse detailed sectional view taken as indicated by line 10—10 on Fig. 7. Fig. 11 is an enlarged sectional view taken as indicated by line 11—11 on Fig. 10, and Fig. 12 is a longitudinal detailed sectional view of an intermediate joint embodied in another form of the invention.

The conduit provided by the present invention is adapted to be embodied in forms for use in various situations. The invention may be embodied in a metallic "rotary hose" for passing circulating fluid to the swivel of a well drilling apparatus, or a conduit for passing or discharging fluid from a vessel, or in forms for handling certain classes of fluid and fluid at various pressures, etc. In Figs. 1 to 11, inclusive, of the drawings, I have illustrated a form particularly suited for use as a rotary hose for passing circulating fluid to the swivel of a well drilling string, and in Fig. 12 I have shown a form that is adapted to be embodied in comparatively small conduits for handling certain classes of fluids and/or fluids at comparatively low pressures. As the invention is capable of embodiment in forms for numerous uses, it is to be understood that the invention is not to be restricted as limited to the particular embodiments described herein, or to the references to their uses.

The portion of the well derrick illustrated in Fig. 1 of the drawings includes the derrick proper 10, a drill stem or kelly 11, extending into the derrick 10, a swivel 12 on the upper end of the drill stem 11, a travelling block 13 suspended in the derrick by a cable 14, a hook 15 depending from the block 13 for carrying the bails 16 of the swivel 12, and various other parts common to well drilling apparatus of this character. A stand pipe or fluid supply pipe 17 is arranged in one corner of the derrick 10 for delivering circulating fluid to the rotary hose.

The form of the invention illustrated in Figs. 1 to 11 of the drawings includes, generally, a plurality of lengths of pipe or tubing 20, intermediate swivel or universal connections 21 connecting the several lengths of pipe 20, an end joint or connection 22 at one end of the conduit for connecting it with the swivel 12, or the like, an end connection 23 at the other end of the conduit for attachment to the stand pipe 17, and a safety means in the nature of a cable 24 loosely connected with the several lengths of pipe 20 and adapted to be attached to suitable parts at the derrick 10.

The sections 20 may be formed of common pipe or tubing and the several sections 20 may be of the same diameter. When the conduit is embodied in a rotary hose for delivering circulating fluid to a swivel, the tubular sections 20 may be formed of drill pipe. Where one end of a conduit is to be attached to a stationary part and the other end to a movable part, it has been found desirable to make the pipe sections 20 at the end attached to the movable part shorter than those at or toward the stationary end. For example, the sections 20 adjacent the end of the conduit connected with the swivel 12 may be shorter than those toward the end attached to the stand pipe 17. This relative proportioning of the sections of pipe permits a maximum amount of movement at the end attached to the movable part. As the swivel 12 is operated vertically in the derrick when carrying out drilling operations and the stand pipe 17 remains stationary, it is desirable to have greater flexibility in the conduit at its swivel end. There may be any desired or suitable number of pipe sections 20 embodied in the conduit. In the particular case illustrated, there are six lengths of pipe or tubing 20.

The intermediate joints or connections 21 are in the nature of swivel or universal joints connecting the several pipe sections 20 so that they may be free to rotate relative to one another, and swing or tilt in various directions relative to one another. Each connection or joint 21 includes, generally, a curved intermediate or central section 25, a bent or curved end section 26 carried on one of the adjoining lengths of pipe 20, a straight end section 27 carried on the end of the other adjoining pipe section 20, connecting means 28 for connecting or holding the sections 25, 26, and 27 together, packing means 29 for preventing the leakage of fluid between sections of the joint, and packing means 30 for preventing the entrance of fluid and foreign material between the sections of the joint.

The central or intermediate section 25 of each of the intermediate joints 21 forms or constitutes a tubular link or connecting member between the end sections 26 and 27 carried on the adjoining pipe sections. The central section 25 is tubular, having a central longitudinal opening or fluid passage 31, and is curved or bent longitudinally as illustrated throughout the drawings. The degree or extent of curvature of the intermediate section 25 may vary in constructions for use in different situations, it being desirable in most instances to make the curve or bend in the section between 60° and 90°. In the case illustrated in the drawings, the section 25 is bent or curved approximately 60° about a center point. In accordance with the invention, the opening or fluid passage 31 is round in cross section and is slightly larger than the fluid passages 32 in the pipe sections 20. The walls of the fluid passage 31 are preferably smooth and regular, and the passage is curved so that there is a minimum amount of friction or resistance offered to the fluid passing through it. Reinforcing ribs 33 may be provided on the exterior of the central section 25. The reinforcing ribs 33 may extend longitudinally of the section and may join or connect with annular enlargements or flanges 34 at opposite ends of the section. An enlargement or socket 35 is provided in each end of the fluid passage 31 within the flange 34. The sockets 35 are cylindric and are machined or finished to receive end parts 39 on the sections 26 and 27. The sockets 35 are preferably sufficiently long to carry the packing means 29 and comparatively long end parts on the end sections 26 and 27, so that effective bearing engagements are provided between the section 26 and the section 25 and the section 27 and the section 25.

The curved or bent section 26 is a tubular member carried on or attached to an end of an adjoining pipe section 20 and is rotatably connected with the central section 25 by the means 28. The end section 26 is longitudinally bent or curved, and its degree of curvature may be substantially the same as that of the central section 25. The opening 36 in the section 26 is round in cross section, and is preferably of the same diameter as the fluid opening 31. The ends of the openings 31 and 36 are in register when the joint is assembled. The outer end portion of the opening 36 is substantially cylindrical and is screw-threaded to receive the threaded end part of the pipe section 20. In the preferred form of the invention, the outer threaded part of the opening 36 is of enlarged diameter and the pipe section 20 is proportioned so that the openings 32 and 36 are in direct register and constitute a substantially unbroken fluid passage which offers a minimum amount of resistance to the flow of fluid. The outer end part 37 of the end section 26 may be polygonal or provided with flattened sides for receiving a tool or wrench. Reinforcing or strengthening ribs 38 may be provided on the exterior of the end section 26.

The inner end part 39 of the section 26 is round in cross section, and is formed to rotatably fit the socket on one end of the central section 25. The part 39 is rotatably connected with the section 25 by the means 28, as will be hereinafter described, and its end is spaced from the bottom or end of the socket to provide a chamber for carrying the packing 29.

The end section 27 of the connection is a substantially cylindric tubular member having a central longitudinal opening 40. The opening or fluid passage 40 is of the same diameter as the opening 31, and its outer end is enlarged and screw-threaded to receive a threaded end of a pipe section 20. The outer part of the section 27 may be polygonal to receive a wrench or similar tool, while its inner end 39 is machined to rotatably fit the socket 35 in the end of the section 25. The end part 39 is connected with the section 25 by the means 28.

The means 28 for connecting the end sections 26 and 27 with the central section 25 holds the three sections of a joint against separation and joins or connects them so that they are free to rotate relative to one another. The means 28 includes sets of spherical members or balls 42 arranged in channels 43 formed by registering annular grooves in the walls of the sockets 35 and the parts 39. There are a sufficient number of balls arranged in each channel 43 to effectively secure and connect the joint sections for free relative rotation. The balls 42 are carried in the channels 43 so that they lock the sections 25, 26, and 27 together against longitudinal separation, and are retained in the channels so that they cannot become displaced. The spherical members or balls 42 may be introduced into the channels through lateral openings 44 in the flanges 34 communicating with the channels. When the balls 42 are in place in the channels 43, the openings 44 may be closed or plugged by plugs 45, threaded and/or keyed in position in the openings 44. It will be apparent how the sets or series of balls 42 effectively connect the several sections of the joint so that they are free to rotate with a minimum amount of resistance and friction and operate to positively prevent disconnection or separation of the sections.

In the preferred form of the invention, means is provided for lubricating the connecting means 28. Lubricant valves or fittings 46, for example, "Alemite" fittings, are threaded into the outer ends of ports 47 communicating with the two channels 43. The fittings 46 are arranged in the bottoms of recesses 48 in the flanges 34. The fittings 46 are positioned in the recesses 48 so that they are protected, and the bottoms of the recesses 48 form effective seats for a grease gun or means for supplying lubricant under pressure. A suitable lubricant, such as grease, or the like, may be passed into the channels 43 through the fittings 46 to lubricate the balls 42 and the sockets 35.

The packing means 29 for preventing the leakage of fluid from between the sections of the joint is embodied in two substantially like units, one being arranged in each of the sockets 35. Each of the units of packing means 29 includes an annular body 50 of packing material arranged in the bottom of a socket 35 to seal between the walls of the socket and the inner ends of the parts 39. The packing rings 50 may be formed of rubber, or rubber composition, and are shaped so that they are expansible by the fluid under pressure, passed by the conduit, to effectively seal with the walls of the sockets and the end parts 39. The outer sides or peripheries of the packing rings 50 seat against the walls of the sockets 35, while their ends seal against the bottoms of the socket and the ends of the end parts 39. The bottoms or ends of the sockets 35 and the ends of the parts 39 are inwardly convergent, as clearly illustrated in Fig. 8 of the drawings. The packing rings 50, as initially formed, have substantially parallel or radial sides as shown in Fig. 9 of the drawings. When the joint is assembled, the inner portions of the packing rings 50 are compressed by the convergent walls of the chambers in which they are arranged so that they are urged into effective sealing engagement with the walls of the socket and the parts 39 through their inherent resiliency.

An annular groove 51 is provided in the inner wall of each packing ring 50. The walls of the groove 51 are inwardly divergent so that the fluid pressure acting on them is effective in forcing the sides of the packing rings into tight sealing engagement with the bottoms of the sockets 35 and the ends of the parts 39. Annular grooves 52 may be provided in the opposite sides or ends of each packing ring 50 to trap fluid that may leak past the inner portions of the packing. The grooves 50 are positioned and shaped so that fluid under pressure entering them is effective in expanding the package so that it prevents further leakage of fluid. When the conduit is in operation, the fluid under pressure passing through the joint acts outwardly on the divergent walls of the groove 51 and effectively compresses the packing 50 into tight sealing engagement with the adjoining parts of the connection; and, in the event that fluid is being passed through the conduit under comparatively low pressures, the inherent resiliency of the packing is effective in preventing leakage of fluid from between the sections of the joint. The balls 42 of the means 38 prevent longitudinal shifting of the sections relative to one another, so that the packing 50 is not subjected to undue strains and does not become distorted, displaced, or excessively worn during use.

The means 30 for preventing the entrance of fluid and solid matter between the sections 25, 26, and 27 of the joint includes a unit of packing arranged at each end of the central section 25 for sealing with the end sections 26 and 27. An annular body of packing 53 is arranged in an annular recess 54 formed in the outer end of each socket 35. The packing 53 is preferably formed of a material that is not softened or otherwise injured by the action of a lubricant. In practice, it has been found desirable to form the packing rings 53 of felt, or the like. Annular shoulders 55 are provided on the end joint sections to engage against the packing rings 53 to retain them in position where they seal between the parts 39 and the joint section 25. The packing rings 53 are effective in preventing the entrance of foreign material between the sections of the joint and also act to prevent lubricant within the sockets 35 from leaking from the connection.

The plurality of lengths of pipe or tubing 20 of the conduit are connected together by the joints or connections 21 of the character just described, and the connections are preferably all disposed in the same relative position so that each length of pipe 20 has a curved end joint section 26 on one end and a straight or cylindrical joint section 27 on the other end. The lengths of pipe or tubing are connected by the joints 21 so they may be revolved relative to one another and may be swung and tilted any desired direction so that the conduit is extremely flexible.

The end joints or connections 22 and 23, for connecting the opposite end portions of the conduit with the swivel 12 and with the supply pipe or stand pipe 17, are in the nature of swivel or universal joints, so that the end pipe sections 20 are free to rotate and swing relative to the parts with which the opposite ends of the conduit are connected. The end joint or connection 23 for connecting the conduit with the stand pipe 17 may be similar in construction to the intermediate joints 21. In practice, the end joint or connection 23 may be identical in construction to an intermediate section 21, being formed of a central section 25ª, a curved or bent end section 26ª, and a straight or substantially cylindrical end section 27ª. It is to be understood that the connection 23 may embody a connecting means for connecting its several sections similar to the connecting means 28 described above, and may include packing means similar to the packing means 29 and 30. In the preferred form of the invention, the connection 23 is mounted so that its straight end section 27ª is connected with the end pipe section 20, while its curved or bent end section 23 is connected with the stand pipe. In the case illustrated, a sub or nipple 56 is provided on the upper end of the stand pipe 17 and is connected with or discharges into the end section 26ª of the joint 23ª.

The end joint or connection 22 for connecting the conduit with the vertically movable swivel 12 includes a straight substantially cylindrical end section 27ᵇ connected with the end pipe section of pipe 20, a curved central section 25ᵇ, a curved or bent section 26ᵇ, a straight section 57 connected with the section 26ᵇ, and a nipple or sub 58 connected with the section 57. The joint sections 27ᵇ, 25ᵇ, and 26ᵇ may be of the same construction as the joint sections 27, 25, and 26, respectively, described above, and may be connected by connecting means 28ᵇ similar to the connecting means 28. The curved or bent joint section 26ᵇ is provided on its outer end with a socket 35ᵇ, and the straight end section 57 is provided with a finished cylindric part 39ᵇ rotatably fitting the socket 35ᵇ. A body of packing 50ᵇ is arranged in the end of the socket 35ᵇ for sealing between the end of the part 39ᵇ and the bottom of the socket, and a series of balls 42ᵇ are arranged in a channel 43ᵇ formed in the socket and the cylindric part 39ᵇ for connecting the section 57 with the section 26ᵇ.

The sub or nipple 58 may be threaded into the outer end of the section 57 and may be provided at its outer end with an annular flange 60. A wing nut 61 is mounted on the nipple 58 for connection with the swivel 12. The nut 61 may have an annular groove 62 for carrying the flange 60 and may be provided with projecting wings 63. It will be apparent how the nut 61 may be threaded onto the inlet connection or port of the swivel 12 so that the conduit will discharge into the swivel. The end joint or connection 22, having the four rotatably connected sections, is particularly flexible so that the end of the conduit attached to the movable swivel is very free to flex and shift with the swivel.

The flexible safety element or cable 24 is loosely attached to the conduit at spaced points, and its opposite ends are secured to parts at, or in, the derrick to prevent falling of disconnected or broken parts of the conduit, and to prevent the whipping about of disjointed parts of the conduit in the event that it fails when passing fluid under pressure. In accordance with the invention, the cable 24 is provided at the exterior of the conduit and is in the nature of a single continuous length of cable. One end of the cable 24 may be attached to a corner post 64 of the derrick, while its other end may be attached to the swivel 12. The cable 24 is loosely connected with each length of pipe 20 and may be loosely connected with each end of each length of pipe 20.

Freely rotatable collars or sleeves 65 are provided on the opposite end parts of each pipe or tubing 20 adjacent a joint or connection. The sleeves 65 are arranged between the ends of a joint 21, or an end joint, and flanges 66 on the pipe 20. The flanges 66 may be welded on the pipe 20 and are spaced from the ends of the joints to permit limited longitudinal movement of the sleeves 65. A lug 67, having an opening 68 for freely passing the cable 24, is provided on each sleeve 65. The lugs 67 project radially outward from the sleeves 65 so that the cable 24 is normally spaced from the pipe sections 20. A slack portion or loop L is provided at each joint or connection 21, so that the cable 24 will not twist about the conduit and prevent its free flexing and so that the slackness in the cable will not occur at one point only. The loops L are maintained at the joints 21 by collars or cable clamps 70 fixed on the cable 24 and adapted to engage the inner sides of the lugs 67. The cable clamps or collars 70 are spaced so that a comparatively large loop or slack portion L is provided at each joint 21. It will be apparent how the collars 70 prevent fouling of the cable 24 about the conduit and prevent the slack in the cable from twisting about the conduit at one point, and otherwise interfering with its free operation.

The form of the invention illustrated in Fig. 12 of the drawings may be constructed without a screw-threaded joint or connection occurring at any point in the conduit. This form of the invention is particularly well suited for embodiment in conduits for handling classes of liquids or fluids that have a tendency to leak from threaded joints, as well as in comparatively small sizes for handling fluids under low pressures, etc. The joints or intermediate connections 21ª, included in this form of the invention for joining the several lengths of pipe or tubing 20ª, include a central or intermediate section 25°, a curved or bent end section 26°, and a straight or substantially cylindric end section 27°.

The intermediate or central section 25° may be similar to the central section 25 described above, being curved longitudinally and having a central longitudinal fluid passage 80. The curved or bent end section 26° may be similar to the end section 26 described above, being curved or bent longitudinally and having a cylindric part 81 on its inner end rotatably fitting a socket 82 in the central section 25°. Packing means 28° of the same general character as the packing 28 described above is provided in the socket 82 to seal between the sections 25° and 26°, and sealing means 30° may be provided to prevent the entrance of foreign material between the sections. The sections 25° and 26° may be connected for rotation by a series of balls 50° arranged in a channel between the cylindric part 81 and the socket 82. In accordance with this form of the invention, the end section 26° is formed integral with the pipe section 20ª, for example, it may be cast thereon.

The straight joint section 27° is similar, generally, to the joint section 27 described above; that is, it is a tubular member having a central opening 40°, and having a finished cylindric part 83 rotatably fitting a socket 84 in the end of the central section 25°. The cylindric part 83 may be rotatably connected in the socket 84 by a series of balls 50°, and packing means 28° is provided to prevent the leakage of fluid from between the sections 25° and the sections 27°. Packing 86 for preventing the entrance of foreign material between the sections 25° and 27° may be provided at the outer end of the straight section 83. The end joint section 27° is formed integral with a pipe section 20ª, as illustrated in Fig. 12 of the drawings. It will be apparent that lubricant may be applied to the sets of balls 50° in the same manner as described above, and that a cable may be connected with this form of conduit if found practical or desirable. It is to be noted that this form of the invention does not embody any screw-threaded connections or any parts that can be accidentally disconnected, or that may loosen with usage.

It is believed that the utility and practicability of the conduits provided by the present invention will be readily apparent from the foregoing detailed description. The pipe sections 20 are connected by the joints 21 so that they are free to rotate and swing in various directions relative to one another, so that the assembly is particularly convenient to handle and is suited for use in various situations. The ball bearings 42 positively lock the sections of the joints together so that they cannot become disconnected, and are arranged so that the sections are freely rotatable relative to one another. The packing rings 50 are constructed and mounted in the joints so that they positively prevent the leakage of fluid from between the sections and are particularly durable as they do not project into the fluid passage of the joint and are not subjected to end thrusts, etc. The relatively movable parts of the joints may be effectively lubricated through the fittings 46, so that there is no danger of the parts becoming rusted or materially worn from usage. The washers of felt, or the like, are effective in preventing the leakage of the lubricant between the sections and positively prevent the entrance of fluid or solid material between the joint sections. The several joints are formed so that the fluid passages through them are larger in diameter than the passages in the pipe sections 20, and the curvatures of the fluid passages in the joints are symmetrical and gradual, so that there is a minimum amount of resistance offered to the passage of fluid through them. The joints 21 each consist primarily of only three main sections that are particularly simple and inexpensive of manufacture and which may be constructed so as to be particularly sturdy and dependable in operation. It is to be understood that the joints 21 may be used in various situations and are not to be considered as limited to the use described.

Having described only typical preferred forms of my invention, I do not wish to limit myself to the specific details set forth, but wish to reserve to myself any changes or variations that may appear to those skilled in the art or fall within the scope of the following claims.

Having described my invention, I claim:

1. In a fluid conduit, two lengths of pipe, tubular end sections on the pipe, a single tubular central section extending between the end sections, integral parts on the end sections extending into sockets in the central section, balls in registering grooves in the said parts and the walls of the sockets to connect the sections for rotation and to prevent their separation, and packing means for preventing the leakage of fluid from between the sections.

2. In a fluid conduit, two lengths of pipe, tubular end sections on the pipe, a single tubular central section forming a fluid connection between the end sections, parts on the end sections extending into sockets in the central section, balls in registering grooves in the parts and the walls of the sockets to connect the sections for rotation and to prevent their separation, and packing means for preventing the leakage of fluid from between the sections including expansible packing in the sockets to seal with the walls of the sockets and the said parts.

3. In a fluid conduit, two lengths of pipe, tubular end sections on the pipe, a single tubular central section forming a fluid connection between the end sections, parts on the end sections extending into sockets in the central section, balls in registering grooves in the said parts and the walls of the sockets to connect the sections for rotation and to prevent their separation, and packing means for preventing the leakage of fluid from between the sections, including rings of packing material sealing against the bottoms of the sockets and ends of the said parts.

4. In a fluid conduit, two lengths of pipe, tubular end sections on the pipe, a single tubular central section forming a fluid connection between the end sections, parts on the end sections extending into sockets in the central section, balls in registering grooves in the said parts and the walls of the sockets to connect the sections for rotation and to prevent their separation, and packing means for preventing the leakage of fluid from between the sections, including rings of expansible material sealing against the ends of the said parts and the bottoms of the sockets and having grooves in their inner sides with inwardly divergent walls exposed to fluid passing through the conduit.

5. In a fluid conduit, two lengths of pipe, tubular end sections on the pipe, a single tubular central section forming a fluid connection between the end sections, parts on the end sections extending into sockets in the central section, members in registering grooves in the parts and the walls of the sockets to connect the sections for rotation and to prevent their separation, and means for passing a lubricant into the grooves.

6. In a fluid conduit, two lengths of pipe, tubular end sections on the pipe, a single tubular central section forming a fluid connection between the end sections, parts on the end sections extending into sockets in the central section, balls in registering grooves in the said parts and the walls of the sockets to connect the sections for rotation and to prevent their separation, packing means for preventing the leakage of fluid outwardly between the sections, and means for preventing the passage of material inwardly between the sections.

7. In a fluid conduit, two lengths of pipe, tubular end sections on the pipe, a single tubular central section forming a fluid connection between the end sections, the central section and one of the end sections being longitudinally curved, parts on the end sections extending into sockets in the central section, balls in registering grooves in the said parts and the walls of the sockets to connect the sections for rotation and to prevent their separation, and packing means for preventing the leakage of fluid from between the sections.

8. In a fluid conduit, two lengths of pipe, tubular end sections on the pipe, a single tubular central section forming a fluid connection between the end sections, the end sections being formed integral with the lengths of pipe, parts on the end sections extending into sockets in the central section, balls in registering grooves in the parts and the walls of the sockets to connect the sections for rotation and to prevent their separation, and packing means for preventing the leakage of fluid from between the sections.

LELAND S. HAMER.